United States Patent [19]
Sybertz

[11] 3,837,384
[45] Sept. 24, 1974

[54] SYSTEM FOR CUTTING SPLINES IN BOARDS
[75] Inventor: Hans Sybertz, Hargesheim, Germany
[73] Assignee: Hubel & Platzer Maschinen-Baugesellschaft m.b.H., Bad Kreuznach, Germany
[22] Filed: Mar. 26, 1973
[21] Appl. No.: 345,219

[30] Foreign Application Priority Data
Mar. 29, 1972 Germany............................ 2215308

[52] U.S. Cl................. 144/326 R, 83/324, 83/329, 144/2 R, 144/91, 144/136 R, 144/315, 144/323, 156/258
[51] Int. Cl............................................. B27c 9/04
[58] Field of Search.......... 156/257, 258; 83/5, 324, 83/329, 330, 313; 144/90, 91, 133, 142, 134 R, 136, 313, 319, 321, 322, 326, 218

[56] References Cited
UNITED STATES PATENTS
2,093,323  9/1937  Lamoreaux.......................... 83/313
3,000,412  9/1961  Jaschke.............................. 144/42 X
3,448,646  6/1969  Bishop.............................. 83/324 X
3,602,275  8/1971  Nissen.............................. 144/91 X Primary Examiner—Andrew R. Juhasz
Assistant Examiner—W. D. Bray
Attorney, Agent, or Firm—Karl F. Ross; Herbert Dubno

[57] ABSTRACT

A board is moved along a straight path forming a chord through the circular orbit of a milling head. The relative speeds of the orbiting head and the moving plank are varied with respect to each other such that the vector of the orbiting speed of the head parallel to the plank displacement direction, i.e., the velocity component in this direction is always equal to the velocity of the plank while this head is in contact with a plank end. Thus, splines are cut of equal length and depth. The head can simultaneously cut splines in the trailing end of a leading workpiece and the leading end of a trailing workpiece, and then on the return swing cut splines in the trailing end of the trailing workpiece and in the leading end of the following workpiece. Several such heads may be mounted on a single rotatable carrier. After cutting of the splines the planks are coated on their ends with adhesive and pushed together axially so as to splice them together.

10 Claims, 13 Drawing Figures

SYSTEM FOR CUTTING SPLINES IN BOARDS

FIELD OF THE INVENTION

The present invention relates to a method of and an apparatus for shaping an end of a workpiece, especially a board. More particularly, this invention relates to an apparatus for cutting splines into the ends of elongate wooden workpieces so as to be able to splice them together.

BACKGROUND OF THE INVENTION

In order to splice together wooden boards, planks and the like, as used for instance in the production of long pieces of trim, the plank or planks to be joined are clamped and a milling head is moved past the end to cut a series of V-grooves that separate and define the splines. Thereafter, at the same or at a different station, an adhesive is introduced between two complementarily splined ends, and these ends are pressed tightly together with the splines overlapping laterally.

Since great precision is needed in the milling, it has heretofore always been necessary to immobilize the workpieces during cutting of the splines. This, of course, creates a substantial bottleneck in the process, thereby limiting output.

OBJECTS OF THE INVENTION

It is therefore an object of the present invention to provide an improved system for shaping the end of a workpiece to form splines therein.

Another object is to provide an improved apparatus for and method of machining the end of a wooden plank or the like.

Yet another object is the provision of a system for milling the end of a workpiece without the aforementioned disadvantages.

SUMMARY OF THE INVENTION

These objects are attained according to the present invention by a system wherein the tool is displaced about in an orbit and the workpieces are displaced along a straight horizontal path above or below the orbit's center and passing through the orbit as a chord. The relative speeds of displacement of the tool and of the workpiece are varied so that during the time when the tool is in engagement with the workpiece its velocity vector parallel to the displacement direction of the workpiece is equal to the advance speed of the workpiece. In this manner, the workpiece is machined at a perfect right angle to its direction of advance, which is parallel to the workpiece longitudinal axis.

The tool can be a milling head, or in the case when the device merely serves to square and smooth the workpiece ends, it can be a sanding drum. The invention is not limited to any particular material-removal operation, but is equally employable with any operation which requires the treatment of a workpiece at right angles to its displacement direction.

According to another feature of this invention the tool is passed between two workpieces, simultaneously machining the trailing end of the leading workpiece and the leading end of the trailing workpiece. The rate of advance of the workpieces is so set that as the same head comes back through their path it then machines the trailing end of the previously trailing workpiece, and the leading end of the workpiece that is following it.

In accordance with yet another feature of this invention, the tool is mounted on a rotatable element and the workpieces are advanced at a constant speed. The drive of the transport for the workpieces is positively connected (i.e., without slip) via a transmission to the drive for the tool carrier which automatically varies the orbiting speed according to the present invention. Two or more such tools can be carried on the rotatable carrier, driven by belts spanned over pulleys on its drive shaft.

Such a system produces splines of perfectly equal length, or otherwise machines the workpiece end perfectly orthogonally to its displacement direction. The workpieces do not stop moving along a transport path during this machining so that an extremely large output can be achieved. After machining, glue is applied between the workpieces, and then they are pushed together, these two operations also being carried out without stopping the workpieces. Thus a continuous strip of wood can be produced at a high rate of speed.

The invention is based upon the recognition that an orbiting tool has a velocity component or vector $V = V_u \cos \alpha$ where $\alpha$ is the angle included between an axial plane of the orbit perpendicular to the plane of the workpiece travel and an axial plane of the orbit including the tool axis. As the latter plane sweeps toward the former, $\alpha$ approches zero and $\cos \alpha$ approaches unity, i.e., the velocity component in the direction of workpiece travel approaches the peripheral speed of the tool axis. Over a portion of this travel the tool engages the workpiece. In order for the machining operation to be carried out without relative movement of tool axis and workpiece in the direction of travel, the speed $V_u$ of the tool axis must be varied so that the product $V_u \cos \alpha = V_B$ during the period of machining or the speed of the board ($V_B$) must be varied with a constant value of $V_u$ so that $V_B = V_u \cos \alpha$.

DESCRIPTION OF THE DRAWING

The above and other objects, features and advantages of the present invention will become more readily apparent from the following description, reference being made to the accompanying drawing in which.

SPECIFIC DESCRIPTION

Figure 3:
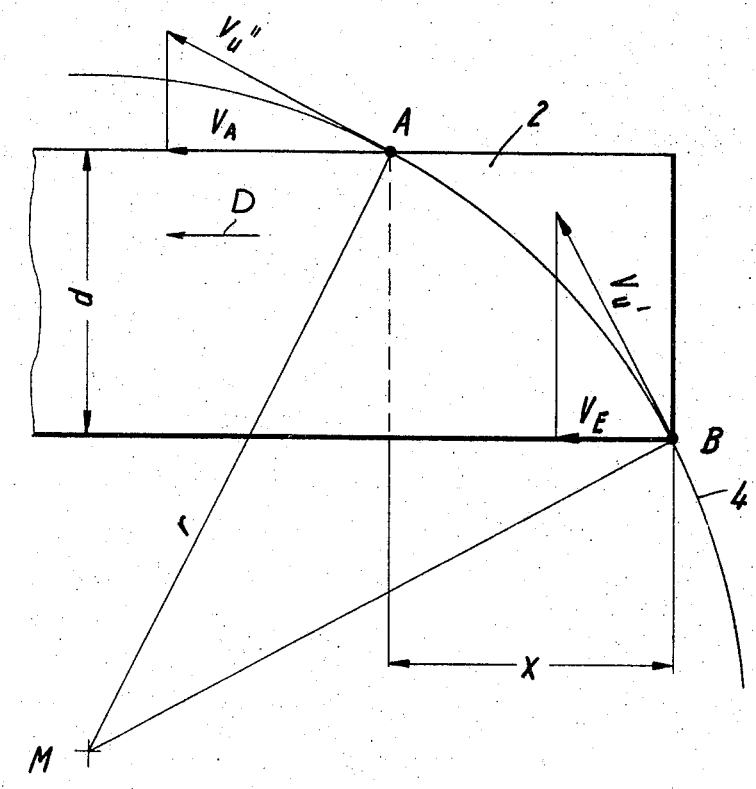
FIG. 3 is a diagram illustrating the principles of my present invention.

The vectors and reference numerals of FIG. 3 stand for the following:

4— the orbit of the cutter;
M— the center of rotation of the tool, hence the center of orbit 4;
r— the radius of the orbit 4;
2— the workpiece;
D— the direction of displacement of workpiece 2;
d— the thickness of the workpiece 2;

A— the location where the tool loses contact with the workpiece 2;

B— the location where the tool engages the workpiece 2;

x— the extent of displacement while the tool is in engagement with the workpiece 2;

$V_u'$— the orbiting speed of the tool as it enters into engagement with the workpiece 2;

$V_E$— the vector (velocity component) parallel to the direction of displacement of the workpiece 2 of peripheral speed $V_u'$;

$V_u''$— the orbiting speed of the tool as it loses contact with the workpiece 2; and $V_A$— the vector (velocity component) parallel to the direction of displacement of the workpiece 2 of peripheral speed $V_u''$.

According to the present invention, either the advance speed of the workpiece 2 is varied between $V_E$ and $V_A$ while $V_u' = V_u''$ or the orbiting speed of the tool is varied so that with a constant workpiece advance speed ($V_E = V_A$), $V_u'$ will increase to $V_u''$. In the diagram of FIG. 3 $V_u'$ is shown equal to $V_u''$. It should be clear that in either case the tool as it passes through the workpiece 2 will move through the same distance x in the direction D, in which the workpiece is moving, as does the workpiece, so that the workpiece will be machined straight up along one end.

Figure 1:
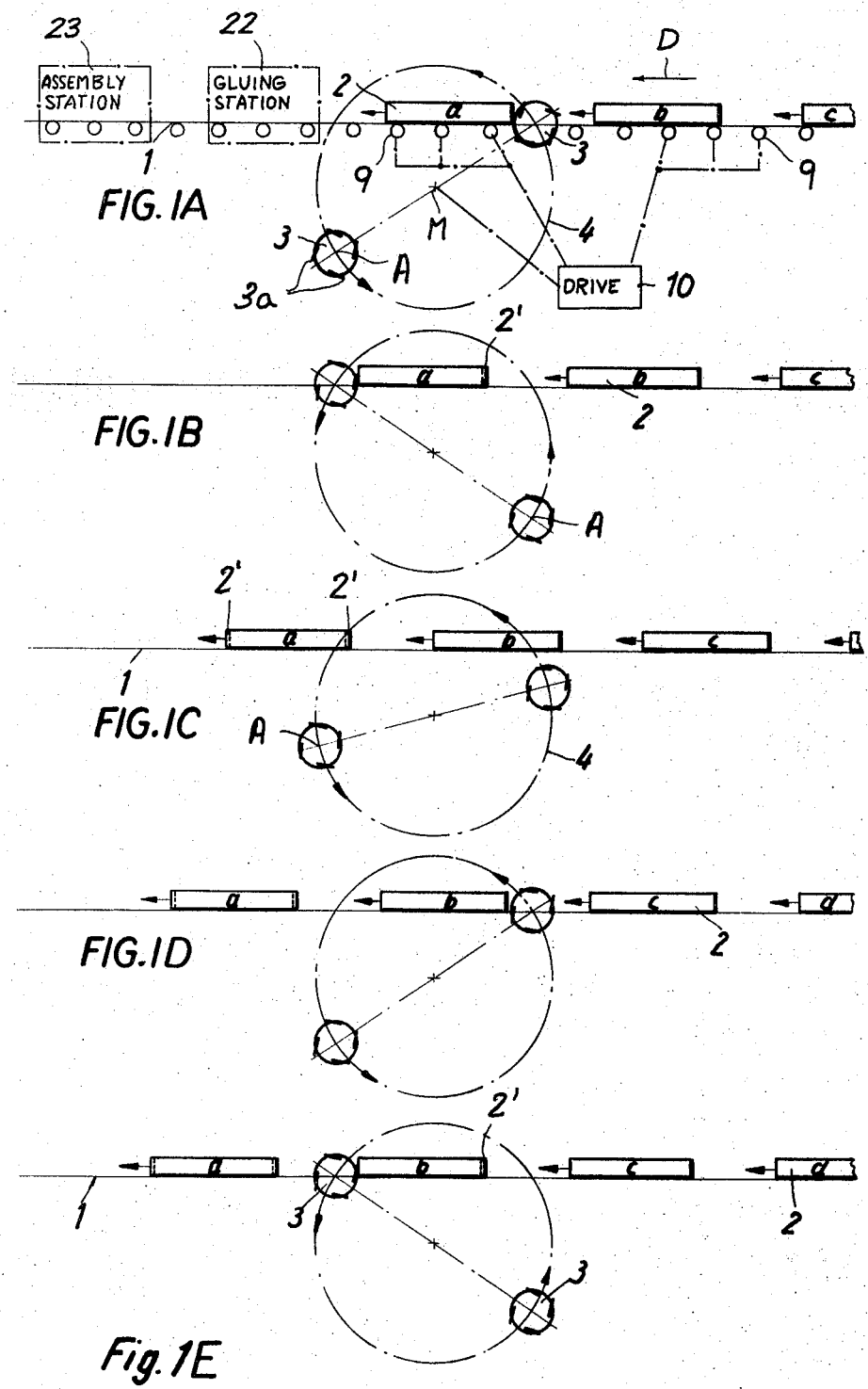
FIGS. 1A–1E are schematic views illustrating an embodiment of the present invention.

FIG. 1A shows an arrangement wherein a milling head 3 having blades 3a, is rotated about its own center A and orbited about center M. The workpieces 2 are advanced along a horizontal path 1 above center M on a plurality of rolls 9 at a speed controlled by a drive 10. The tool axis speed $V_u$ is maintained constant and the advance speed of the workpieces is varied between $V_E$ and $V_A$.

As seen in FIG. 1A, when the tool 3 engages the workpiece from below at point B the advance speed of this workpiece, here the leading workpiece bearing reference letter a, is increased so that it is always equal to the velocity vector (velocity component) of the tool 3 in that direction. The tool then swings over the workpiece 2a and comes back down across its front to cut further splines 2' in its leading end. During this second cut the workpiece advance speed is continuously decreased so as to form splines of constant length across the whole width of the workpiece.

Thereafter, another tool 3 orbiting 180° behind the first-mentioned tool comes up against the rear of the second workpiece 2b (FIG. 1D) and then down across its front (FIG. 1E). This workpiece 2b is then coated on its end with adhesive at 22 and pushed against workpiece 2a at 23.

Figure 4A:
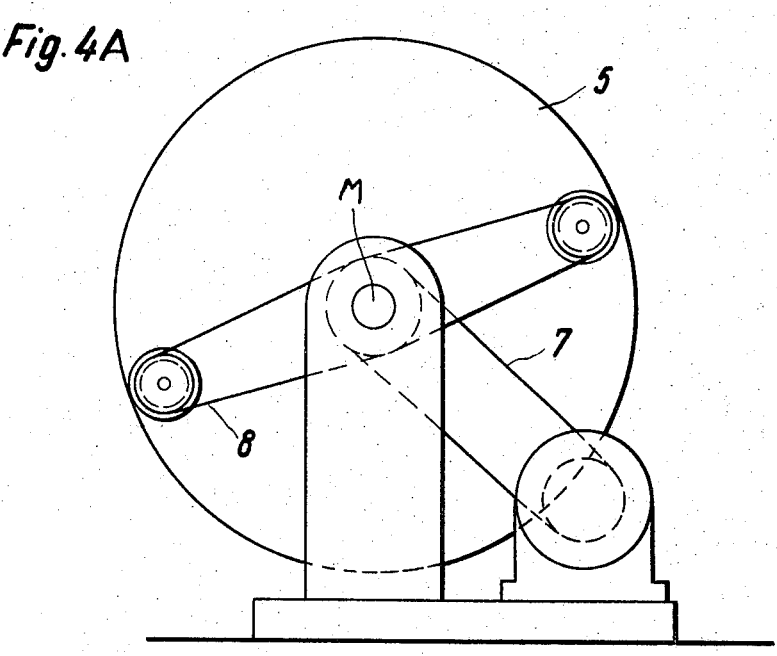
FIGS. 4A and 4B are side and top views, respectively, of a portion of the arrangement of FIGS. 1A–1E in enlarged scale.
Figure 4B:
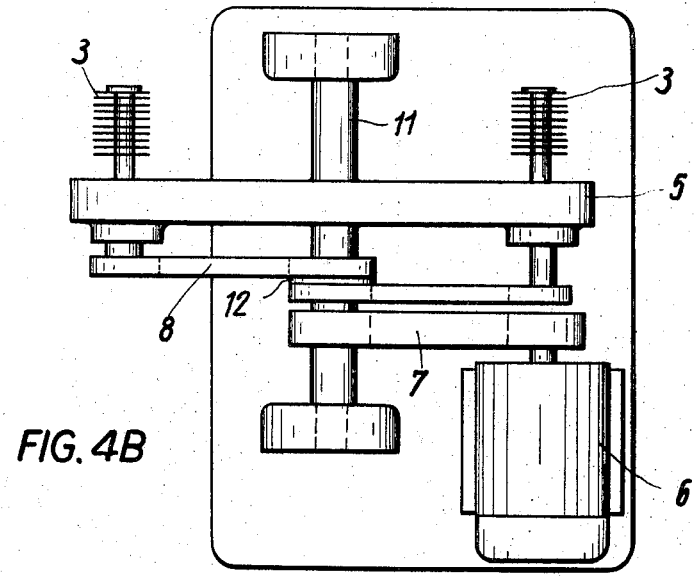

FIGS. 4A and 4B show how a motor 6 forming part of the drive 10 is connected via a belt 7 to a shaft 11 carrying a disk 5 on which two spline cutters 3 are mounted. Each cutter 3 is freely rotatable about its own axis A parallel to the shaft 11 by means of a belt 8 driven by a pulley 12 on the shaft 11. This motor 6 can be a hydraulic motor connected to another hydraulic motor in the drive 10 which serves to vary the speed of the rolls 9 which determine the speed of advance of the workpieces 2a-2c. A cam or the like carried on the shaft 11 can operate a small control valve.

Figure 2:
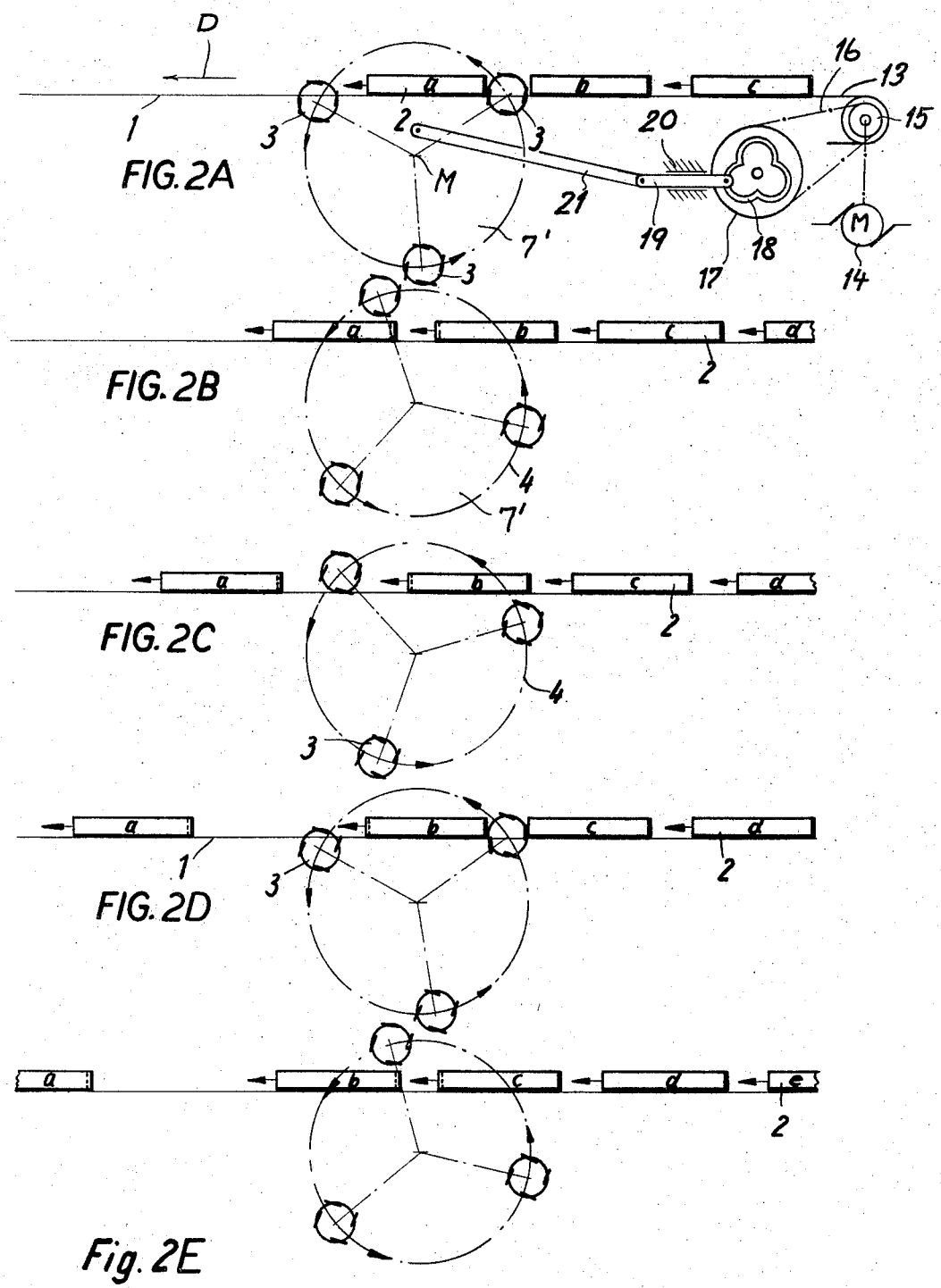
FIGS. 2A–2E are views similat to FIGS. 1A–1E, illustrating another embodiment of this invention.

In FIGS. 2A-2E an arrangement is shown wherein three cutters 3 spaced apart by 120° are displaced around in orbit 4 and each cutter simultaneously finishes the trailing end of one workpiece and the leading end of the following one. Thus, each revolution of the cutter disk 7' here corresponds to the treatment of three entire workpieces. In this arrangement it is possible, as shown in FIG. 2A, to drive a belt 13 supporting the workpieces 2a, d at a constant speed by a motor 14 also driving a sprocket wheel 15 connected via a chain 16 to another sprocket wheel 17 formed with a three-lobed groove 18 in which a slave-cam follower 19 slidable in a slide 20 engages. A tie rod 21 connects the follower 20 to the disk 7' to drive the disk 7' at an angular velocity which increases and decreases three times in each revolution. Elements 15-21 constitute a positive transmission serving to drive the disk 7'. FIGS. 2C-2E show how the arrangement will function if the cutters 3 are orbited at a constant speed and the workpieces 2a, d instead are advanved at a constantly increasing and decreasing speed when engaged by a cutter 3.

With either arrangement, or even an arrangement combining the two, wherein both speeds are varied together continuously, the finished product is machined at a right angle to the transport direction D. The output of such a device is largely a function of how large r is and how high orbiting speed $V_u$ is and is considerable as the boards 2 need never stop as they are cut, glued and clamped.

I claim:

1. A method of machining the end of a workpiece comprising the steps of:
    displacing a tool in an orbit;
    advancing a workpiece against said tool along a straight path passing as a chord through said orbit; and
    relatively varying the orbiting speed of said tool and the advance speed of said workpiece upon engagement of the tool therewith such that the velocity vector of the tool in the direction of advance of said workpiece during such engagement is equal to said advance speed.

2. The method defined in claim 1 wherein said orbit is circular and said advance speed of said workpiece is held constant.

3. The method defined in claim 1 wherein said orbit is circular and said orbiting speed of said tool is held constant.

4. The method defined in claim 1 wherein said orbit is circular and a succession of such workpieces are displaced along said path at fixed intervals, said tool being brought into engagement simultaneously with the trailing end of one workpiece and the leading end of the following workpiece.

5. The method defined in claim 1 wherein said orbit is circular and said tool is first brought into engagement with the trailing end of said workpiece and thereafter brought into engagement with the leading end of said workpiece.

6. The method defined in claim 1, further comprising the step of rotating said tool while orbiting it.

7. An apparatus for machining the end of a workpiece, said apparatus comprising:
    a carrier rotatable about an axis;
    a tool supported on said carrier and defining an orbit on rotation thereof;
    drive means for rotating said carrier about said axis, thereby displacing said tool along said orbit for engagement with said workpiece;

transport means for advancing a workpiece against said tool along a straight path passing as a chord through said orbit; and means operatively connecting said drive means and said transport means for relatively varying the orbiting speed of said tool and the advance speed of said workpiece to maintain the velocity vector of said tool parallel to said path during such engagement equal to said advance speed.

8. The apparatus defined in claim 7 wherein said tool is a milling head, said apparatus further comprising means for rotating said tool about an axis.

9. The apparatus defined in claim 8 wherein said carrier is provided with two such tools.

10. The apparatus defined in claim 7 wherein the speed-varying means is a positive transmission connected between said drive means and said transport means.

* * * * *